(12) United States Patent
Kubota (10) Patent No.: US 8,463,119 B2
(45) Date of Patent: Jun. 11, 2013

(54) IMAGE PICKUP APPARATUS AND CONTROLLING METHOD THEREFOR

(75) Inventor: Akira Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 12/966,435

(22) Filed: Dec. 13, 2010

(65) Prior Publication Data

US 2011/0150451 A1    Jun. 23, 2011

(30) Foreign Application Priority Data

Dec. 21, 2009    (JP) ................................. 2009-289343

(51) Int. Cl.
*G03B 15/03*    (2006.01)
*G03B 7/00*    (2006.01)
*G03B 7/08*    (2006.01)
*H04N 5/222*    (2006.01)

(52) U.S. Cl.
USPC ............ 396/159; 396/164; 396/225; 396/231

(58) Field of Classification Search
USPC ................. 396/159, 155, 164, 166–168, 213, 396/225, 231; 348/362, 366, 370
See application file for complete search history.

(56) References Cited

U.S. PATENT DOCUMENTS

| 5,896,014 | A |  | 4/1999 | Ogawa et al. |
| 2008/0252749 | A1 | * | 10/2008 | Fujiwara ................... 348/224.1 |
| 2009/0073275 | A1 | * | 3/2009 | Awazu ....................... 348/222.1 |

FOREIGN PATENT DOCUMENTS

| CN | 1402075 A | 3/2003 |
| JP | 2006171315 A | 6/2006 |

OTHER PUBLICATIONS

The above references were cited in a European Search Report issued on Apr. 7, 2011, enclosed, that issued in the corresponding European Patent Application No. 10194418.9.

The above reference was cited in a Jan. 23, 2013 Chinese Office Action, which is enclosed with English Translation, that issued in Chinese Patent Application No. 201010608365.4.

* cited by examiner

*Primary Examiner* — Rochelle-Ann J Blackman
(74) *Attorney, Agent, or Firm* — Cowan, Liebowitz & Latman, P.C.

(57) ABSTRACT

An image pickup apparatus that is capable of reducing variation in the color temperature of a subject in a taken image and capable of shooting a more suitable image. The image pickup apparatus can shoot with emitting a light emitting unit. A color temperature acquisition unit acquires information about a color temperature of a light illuminating a subject. An emission control unit controls emission of the light emitting unit. The emission control unit determines emission light amount of the light emitting unit based on a color temperature difference between a color temperature of an illumination light of the light emitting unit and a color temperature based on the information acquired by the color temperature information acquisition unit.

17 Claims, 10 Drawing Sheets

FIG.7A  FOREHEAD AREA HISTOGRAM

FIG.7B  NOSE-CHEEK AREA HISTOGRAM

FIG.7C  NOSE-CHEEK-MOUTH AREA HISTOGRAM

FIG.7D  ENTIRE FACE HISTOGRAM

IMAGE PICKUP APPARATUS AND CONTROLLING METHOD THEREFOR

BACKGROUND OF THE INVENTION

1. Field of the Invention

The present invention relates to an image pickup apparatus that enables shooting with emitting a light emitting unit, and a control method therefor.

2. Description of the Related Art

Conventionally, a camera has an automatic exposure control (AutoExposure) function to set an aperture, a shutter speed, and sensitivity appropriately according to brightness of a subject at the time of shooting.

A camera emits a strobe when shooting a backlight scene, such as a scene where a person stands before the sun, with a background in proper brightness, or when shooting in a low illumination environment with a high shutter speed in order to reduce a camera shake.

A color temperature of the strobe light is determined by a characteristic of a light-emitting device. A xenon tube has a color temperature of about 5500 to 6000 K.

On the other hand, sunlight outdoors in daytime has a color temperature of about 5500 K, so it is much the same as that of the strobe light by the xenon tube. On the other hand, there are light sources with a low color temperature of about 2500 K such as a filament lamp.

When shooting with strobe emission under such a light source of which the color temperature is largely different from that of the light of the strobe mounted on a camera, a white balance cannot be kept due to mixture of the color temperatures that are different to each other, which may make a taken image be unnatural.

SUMMARY OF THE INVENTION

The present invention provides an image pickup apparatus and a control method therefor that are capable of reducing variation in the color temperature of a subject in a taken image and capable of shooting a more suitable image.

Accordingly, a first aspect of the present invention provides an image pickup apparatus that is possible to shoot with emitting a light emitting unit comprising a color temperature acquisition unit configured to acquire information about a color temperature of a light illuminating a subject, and an emission control unit configured to control emission of the light emitting unit, wherein the emission control unit determines emission light amount of the light emitting unit based on a color temperature difference between a color temperature of an illumination light of the light emitting unit and a color temperature based on the information acquired by the color temperature information acquisition unit.

Accordingly, a second aspect of the present invention provides a control method for an image pickup apparatus that is possible to shoot with emitting a light emitting unit, the method comprising a color temperature acquisition step of acquiring information about a color temperature of a light illuminating a subject, and an emission control step of controlling emission of the light emitting unit, wherein emission light amount of the light emitting unit is determined in the emission control step based on a color temperature difference between a color temperature of an illumination light of the light emitting unit and a color temperature based on the information acquired in the color temperature information acquisition step.

According to the present invention, the variation in the color temperature of the subject in a taken image can be reduced, and a more suitable image can be shot.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
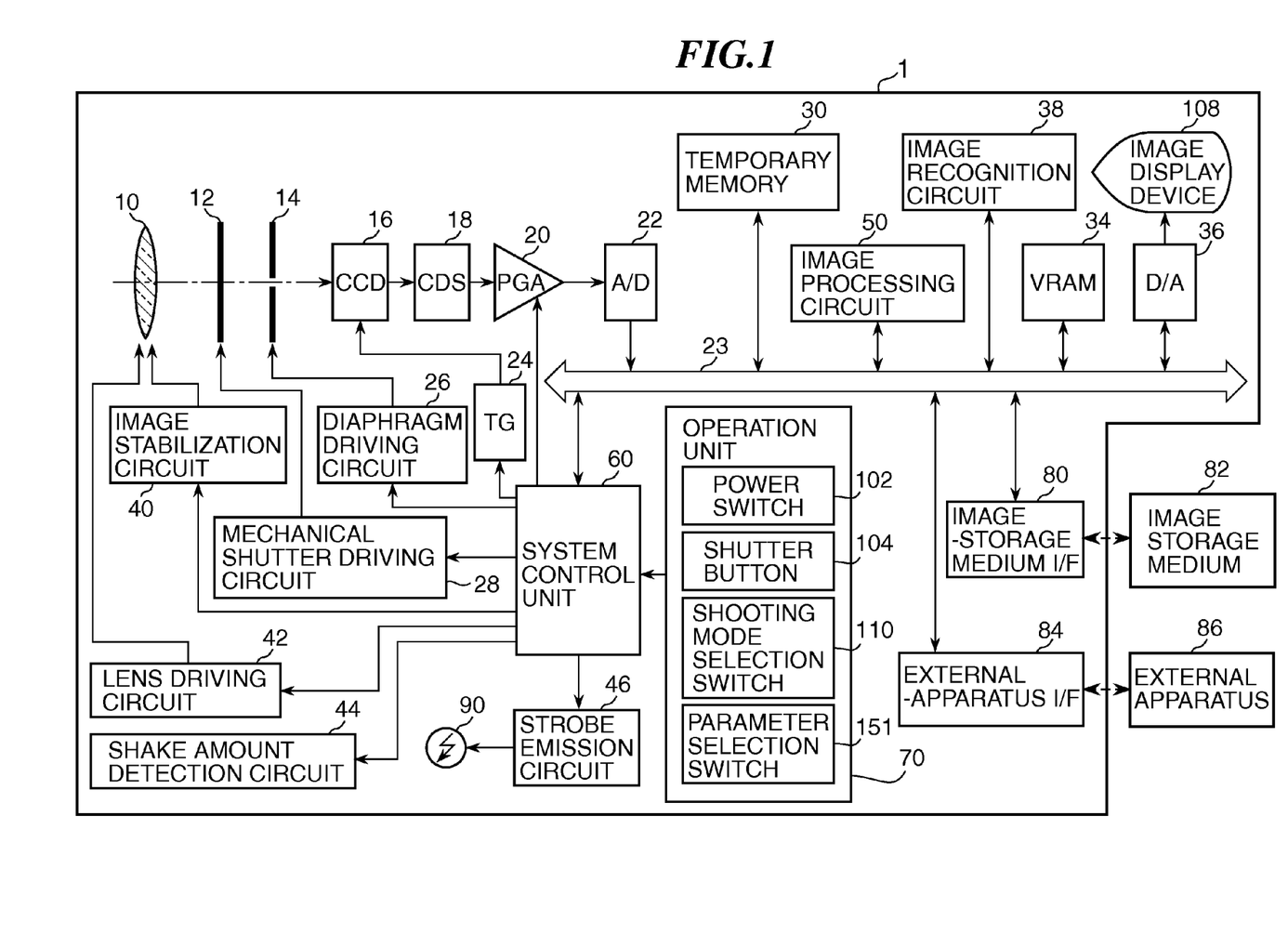
FIG. 1 is a block diagram schematically showing a configuration of a camera according to an embodiment of the present invention.

FIG. 1 is a block diagram schematically showing a configuration of a camera according to the present embodiment. The camera 1 condenses an extraneous light by a lens 10. The camera 1 adjusts a focal point and a field angle by moving the lens 10 forward and backward along an optical axis by a lens driving circuit 42.

The camera 1 drives the lens 10 so as to change the optical axis in a direction to cancel hand shake by an image stabilization circuit 40 based on a shake amount of the camera measured by a shake amount detection circuit 44, and compensates the hand shake optically. The shake amount detection circuit 44 is provided with a gyro sensor. Although the image stabilization is achieved by driving the lens 10 in the configuration shown in FIG. 1, it can be also achieved by driving an image pickup device 16 such as a CCD or a CMOS.

Light amount passed through the lens 10 is adjusted by a diaphragm 14. A system control unit 60 controls the diaphragm 14 by transmitting diaphragm control information to a diaphragm driving circuit 26.

The system control unit 60 controls the diaphragm 14 via the diaphragm driving circuit 26 so as to stop down the diaphragm to drop the light amount when a subject brightness is high, and so as to open the diaphragm to take much light when the subject brightness is low.

The system control unit 60 controls a mechanical shutter (it is also called a "shutter", simply) 12 by transmitting mechanical shutter control information to a mechanical shutter drive circuit 28. The system control unit 60 determines open-to-close time for the shutter, and provides instructions to the mechanical shutter drive circuit 28.

The light passed through the lens 10, the mechanical shutter 12, and the diaphragm 14 is received by the image pickup device 16. The system control unit 60 controls the image pickup device 16 by transmitting a control signal to a TG (Timing Generator) 24.

The TG 24 drives the image pickup device 16 according to the control signal received from the system control unit 60. The image pickup device 16 periodically executes an exposure process and a data read-out process. These processes are executed on the basis of a driving signal from the TG 24.

The TG 24 controls exposure time of the image pickup device 16. The exposure time can be controlled by outputting the driving signal from the TG 24 to the image pickup device 16 at an arbitrary timing so that the device opens the stored electric charge.

Image data read out from the image pickup device 16 is inputted into a CDS (Correlated Double Sampler) 18. The CDS 18 removes a noise component of the image data inputted by correlation double sampling systems.

The image data processed by the CDS 18 is inputted into a PGA (Programmable Gain Amplifier) circuit 20, and the level of the image data is attenuated or amplified.

The system control unit 60 controls an amplifying ratio by transferring an amplifying level to the PGA 20. Usually, correct exposure of the image pickup device 16 is obtained by setting the diaphragm 14 so that the exposure amount of the image pickup device 16 becomes appropriate, and by setting exposure time appropriately by the shutter etc. On the other hand, the PGA 20 attenuates or amplifies the image data to change the exposure of the image data artificially. The artificial exposure change provides a user with a function as a concept of sensitivity that is one of the exposure conditions such as the shutter speed and an aperture at the time of shooting. The system control unit 60 controls the exposure by controlling these aperture, shutter speed, and sensitivity.

The image data outputted from the PGA 20 is converted into a digital signal from an analog signal by an A/D (Analog/Digital) converter 22.

The image data digitized by the A/D converter 22 is inputted into an image processing circuit 50 via a data bus 23. The image processing circuit 50 comprises a plurality of blocks, and achieves various functions.

The image pickup device 16 generally extracts a specific color component for every pixel through a color filter. The image data from A/D converter 22 has a data format that comprises a color component corresponding to a pixel of the image pickup device 16 and an arrangement of the color filter. This data format is not suitable for an automatic exposure control (AE) that evaluates only a brightness component and controls exposure.

The image processing circuit 50 is provided with a function to eliminate the color information from the image data and to extract only brightness information. The image processing circuit 50 is also provided with a function to extract the color information. The color information is used for a white balance process that specifies the light source of the subject and adjusts colors appropriately.

The image processing circuit 50 is provided with a function to extract only a frequency component of the signal read from the image pickup device 16. The extracted frequency component is used by an automatic focusing control (AF: Auto Focus). The image processing circuit 50 is provided with a function to determine which area becomes a target from which the frequency component is extracted among the image data read from the image pickup device 16, and a function to perform area division. The image processing circuit 50 drives the image pickup device 16 in a mode suitable for an AF process when performing the AF process.

The image processing circuit 50 is provided with a function to adjust image quality of a taken image by operating a signal level, a color effect, etc. of the image data digitized by the A/D converter 22. There are a function to increase or decrease a signal level with an amplification factor uniform for the whole image, a tone curve (gamma) function to convert the signal level according to intensity of an original signal level, a function to increase or decrease the signal level with the amplification factor according to the frequency component for every area in the image, etc., about the level of the image data. These functions enable level adjustment for various kinds of image data.

The image data digitized by the A/D converter 22 is stored into a temporary memory 30 while it is inputted into the image processing circuit 50.

The image data appropriately processed by the image processing circuit 50 is inputted into an image recognition circuit 38. The image recognition circuit 38 recognizes a brightness condition, a focus condition, and a color condition of the inputted image, and further detects a face area of a person and performs face recognition of the detected face. When there are characters, the information thereof is recognized.

In addition to the method of recognizing an image by the image recognition circuit 38, the system control unit 60 can also perform the image recognition process. The system control unit 60 reads the image data stored in the temporary memory 30, and analyzes the image data to recognize a condition of a scene.

The system control unit 60 develops the image data processed by the image processing circuit 50 onto a VRAM 34, converts it into analog data in a D/A convertor 36, and displays it on an image display device 108 such as an LCD.

When implementing an electronic viewfinder function, continuous image data read from the image pickup device 16 is sequentially displayed on the image display device 108 and is updated.

The image display device 108 can also display the image data stored in an image storage medium 82. The image storage medium 82 is nonvolatile memory that stores the taken image data via an image-storage-medium I/F (Interface) 80 connected to the data bus 23 and reproduces. A strobe emission circuit 46 controls emission light amount, light-emitting timing, etc. of a strobe 90 according to instructions from the system control unit 60. The color temperature of the light emitted by the strobe unit 90 is preferably stored in a storage unit in the system control unit 60.

The camera 1 is connectable with external apparatuses 86 such as a PC and a printer via an external-apparatus I/F (Interface) 84.

An operation unit 70 includes a power switch 102, a shutter button 104, a shooting mode selection switch 110, and a parameter selection switch 151. The shooting mode selection switch 110 changes camera operation modes such as a still image shooting mode, a moving image shooting mode, and a reproduction mode. The camera operation modes may include many still image shooting modes such as a landscape shooting mode, a person shooting mode, etc. that are optimized for a specific scene to be shot.

A user can select shooting conditions at the time of shooting such as a focusing zone, a photometry mode, etc., a page feed at the time of reproduction of the taken image, the entire settings of the camera operations, by means of the parameter selection switch 151. The shutter button 104 is one operating member. When depressing the shutter button 104 halfway, a photometry switch turns on. When fully depressing the shutter button 104, a release switch turns on.

Figure 2A:
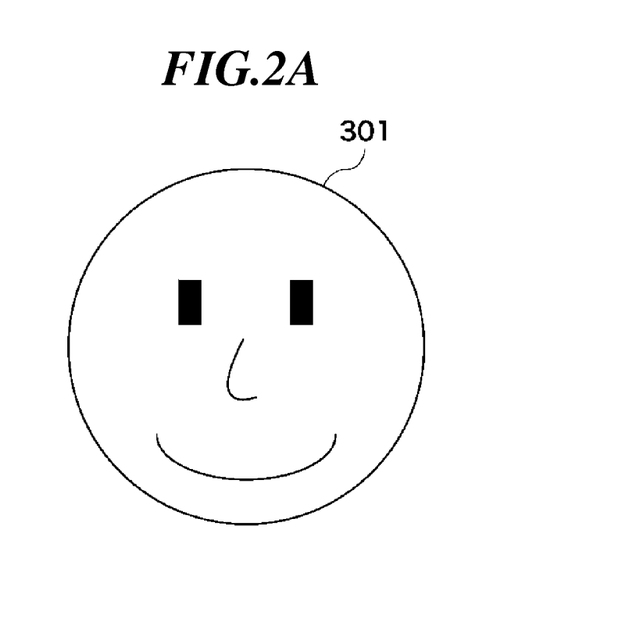
FIG. 2A and FIG. 2B are views showing two examples of persons' faces that are exposed to different extraneous lights.

Next, two examples of persons' faces that are exposed to different extraneous lights (lights such as sunlight and an indoor illumination light other than strobe lights) will be described with reference to FIG. 2A and FIG. 2B. FIG. 2A shows a scene in which a person's face is uniformly exposed to the extraneous light and contrast in the person's face is low. In such a case, it is possible to take a suitable image regardless of the emission or no-emission of the strobe, when the brightness of the whole face is measured by average metering, and when the aperture, the shutter speed, and the sensitivity are determined based on the metering result.

Figure 2B:
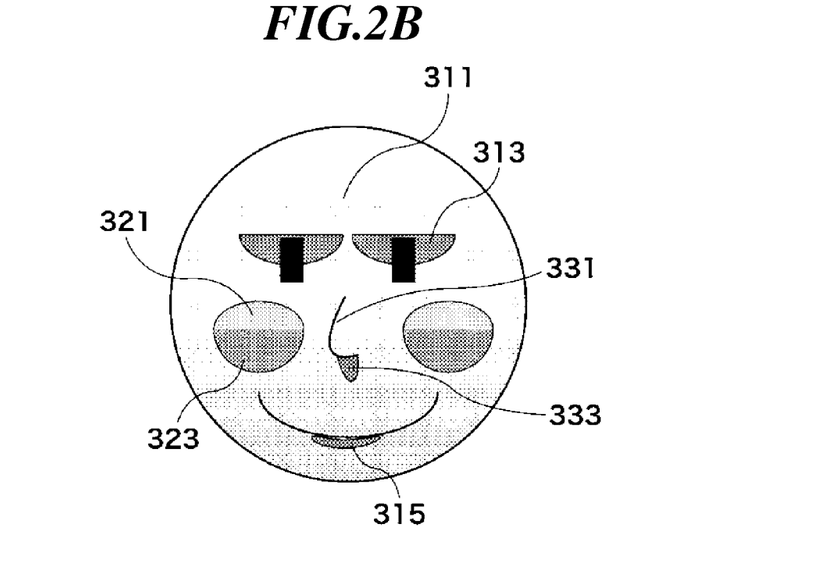

On the other hand, FIG. 2B shows a scene in which a person stands outdoors under the sunlight in daytime or a person stands directly under an indoor illumination light and contrast in the person's face is high.

When a light source is located over the person's head, while a forehead part 311 of the person is exposed to a strong extraneous light, a recessed part 313 around an eye and a mouth-jaw part 315 are not exposed to the extraneous light enough and are shadowed. While a cheek part 321 and a nose part 331 are exposed to the strong extraneous light, a lower cheek part 323 and a lower nose part 333 tend to be shadowed.

Thus, when the high contrast occurs in the person's face, a suitable photograph as portraiture cannot be taken as-is. In such a case, it is desirable to emit the strobe at the time of the shooting so that the shadowed parts are exposed to the light in order to reduce the contrast in the image.

In the shooting with the strobe emission, when contrast occurs in a face due to a light source of low color temperature like a filament lamp particularly, it becomes very important what kind of exposure condition is selected at the time of shooting.

Figure 3A:
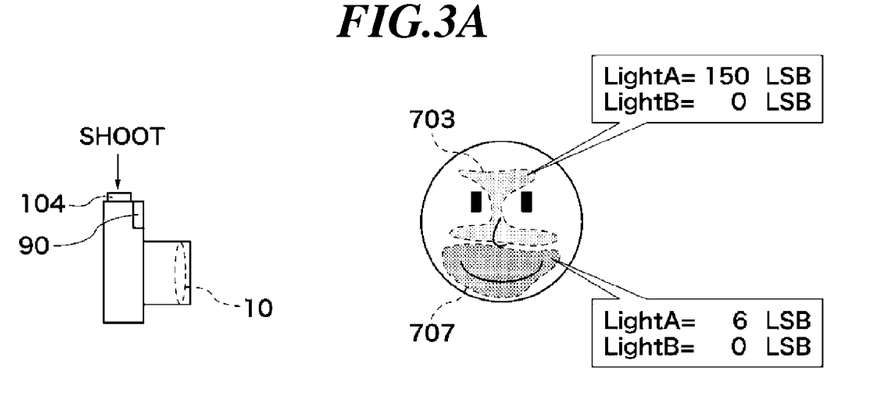
FIG. 3A, FIG. 3B, and FIG. 3C are views showing combination examples of exposure settings and strobe emissions.
Figure 3B:
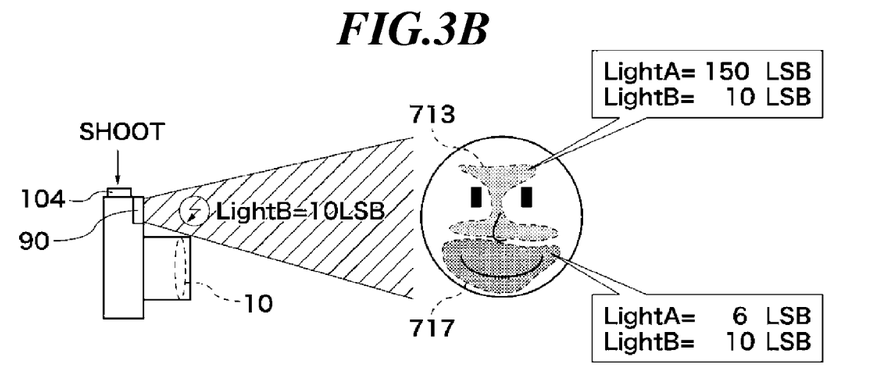
Figure 3C:
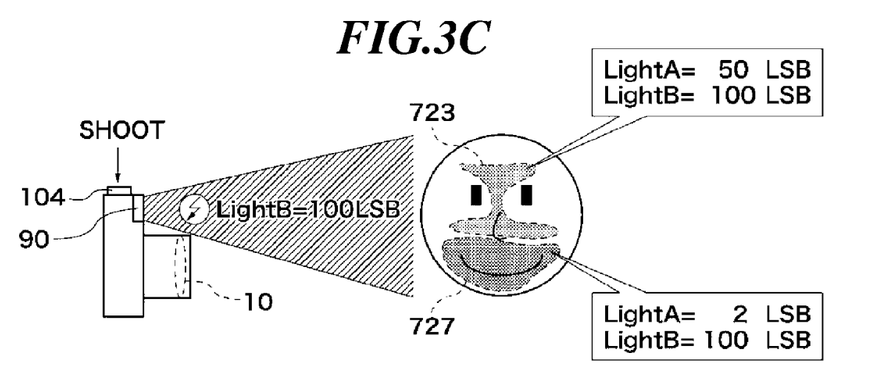

FIG. 3A, FIG. 3B, and FIG. 3C are views showing combination examples of exposure settings and strobe emissions. Each figure shows a case when shooting a person whose face has contrast due to a light source LightA of low color temperature. FIG. 3A shows a case where the strobe does not emit. FIG. 3B shows a case where the strobe emits and an exposure under-compensation process is not executed. FIG. 3C shows a case where the strobe emits and the exposure under-compensation process is executed.

In the example shown in FIG. 3A, an area 703 near a forehead, a nose, and a cheek of the person is exposed to an illumination light of low color temperature, and an area 707 from a lower cheek to a jaw is hardly exposed to the illumination light and shadowed.

In the following description, intensities of the illumination light of a filament lamp (LightA) and the strobe light (LightB) will be represented by numeric values corresponding to outputted signal levels from the image pickup device 16 when the image pickup device 16 receives these lights. In FIG. 3A, the brightness in the area 703 near the forehead, the nose, and the cheek is represented as "LightA=150 LSB (Least Significant Bit), LightB=0 LSB". On the other hand, the brightness of the area 707 of the lower cheek is represented as "LightA=6 LSB, LightB=0 LSB". In this case, since the strobe does not emit, there is no influence by the strobe light, and the high contrast occurs by the LightA. Although an AE control is performed in order to achieve correct exposure with respect to the person's face, the contrast cannot be reduced by the AE control only. That is, as a result of performing the AE control so as to achieve the correct exposure by averaging the brightness in the face including the bright area and the dark area, the face that has no uniformity in the brightness is obtained as a taken image.

FIG. 3B shows the example when shooting with the strobe emission using the exposure condition in FIG. 3A as-is. Here, the example where the strobe emits with the light amount of 10 LSB is shown. As a result, in FIG. 3B, the brightness of the area 713 near the forehead, the nose, and the cheek is represented as "LightA=150 LSB, LightB=10 LSB". On the other hand, the brightness of the area 717 of the lower cheek is represented as "LightA=6 LSB, LightB=10 LSB". This means that the ratio of the light LightB of high color temperature is high in the area 717 of the lower cheek, although the ratio of the light LightA of low color temperature is high in the area 713 near the forehead, the nose, and the cheek. That is, since the color temperature varies with the areas in the face, a suitable taken image is not obtained.

It should be noted that since an actual face has depression and projection, incident conditions of the strobe light to the respective areas are different due to a difference in the distances from the strobe to the areas or a difference in the incident angle of the strobe light. However, in FIG. 3A, FIG. 3B, and FIG. 3C, it is described assuming that the areas in the face are uniformly exposed to the strobe light of 10 LSB in order to simplify the description.

FIG. 3C shows an example when shooting with the strobe emission and decreasing the exposure by 1.6-step under as compared with the exposure condition in FIG. 3A. First, the light LightA that exposes the area 723 near the forehead, the nose, and the cheek varies from 150 LSB to 50 LSB by setting the exposure at 1.6-step under. On the other hand, the light LightA that exposes the area 727 from the lower cheek to the jaw varies from 6 LSB to 2 LSB. This shows that the exposed light amount of the extraneous light of the low color temperature by the filament lamp decreases.

When emitting the strobe under this exposure condition so that the brightness of the face becomes proper, the strobe light amount is assumed to be 100 LSB. The brightness in the area 723 near the forehead, the nose, and the cheek is represented "LightA=50 LSB, LightB=100 LSB". On the other hand, the brightness of the area 727 of the lower cheek is represented as "LightA=2 LSB, LightB=100 LSB". Thus, the light amount of the strobe light LightB is more than that of the extraneous light LightA in every area.

Accordingly, the variation in the color temperature of the areas in the person's face is reduced, it becomes easy to bring the white balance of the face close to the proper condition. Also about the contrast in the person's face, as compared with FIG. 3A and FIG. 3B, the pattern in FIG. 3C is improved more, and a more suitable image is obtained.

Thus, it is necessary to correctly detect the contrast in the person's face that has occurred spontaneously by the extraneous light in order to shoot with the strobe emission so as to reduce the contrast occurred in the person's face. A phenomenon in which the extraneous light generates a bright part and a dark part in a person's face occurs according to the concavo-convex condition of the face. For example, a forehead, a cheek, a nose, etc. are provided as a convex part. An eye, a lower cheek, a lower nose, a mouth, etc. are provided as a concave part. Therefore, the contrast in the face can be detected by metering (brightness detection) a high brightness level in a convex area and a low brightness level in a concave area.

In this embodiment, a method to acquire brightness distribution by dividing a person's face into ten areas will be described as one of methods of detecting contrast in the face.

Figure 4:
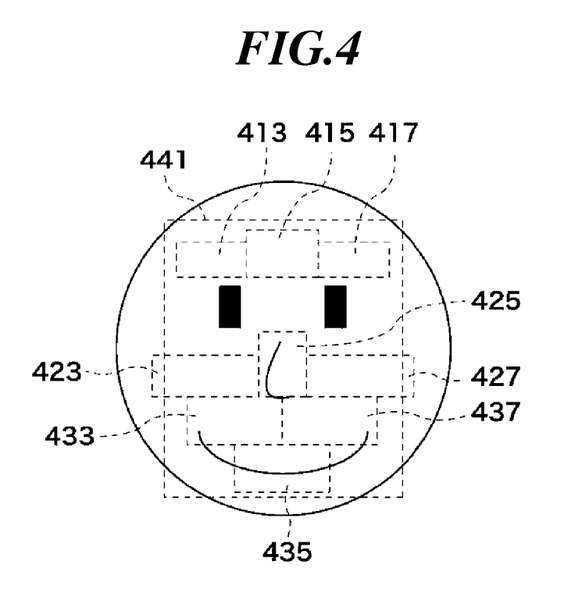
FIG. 4 is a view showing areas used for acquisition of brightness distribution.
Figure 5:
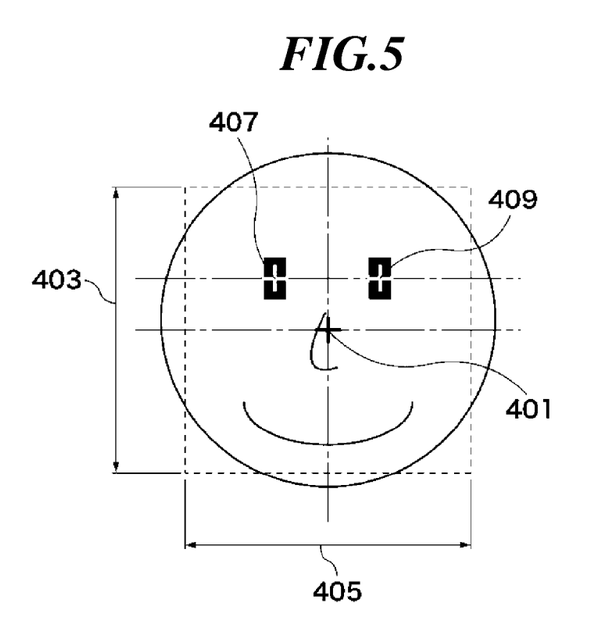
FIG. 5 is a view showing face information recognized by an image recognition circuit.

FIG. 4 is a view showing a person's face divided into ten areas which are areas used for acquisition of luminance distribution. As a premise at the time of dividing a face, face information acquired from the face detection block in the image recognition circuit 38 comprises a coordinate 401 of a face center position in an image, face sizes 403, 405, and coordinates 407, 409 of positions of right and left eyes as shown in FIG. 5.

A forehead area shown in FIG. 4 comprises three blocks 413, 415, and 417, and is arranged at a position at a predetermined distance from the position of the person's eye in a direction to the top of head. A nose-cheek area comprises three blocks 423, 425, and 427, and is arranged at a position at a predetermined distance from the position of the person's eye in a direction to the jaw. A mouth area comprises three blocks 423, 425, and 427, and is arranged at a position at a predetermined distance from the position of the person's eye in a direction to the jaw.

Thus, each area is arranged at the position at the predetermined distance from the position of the eye. Here, a value corresponding to the face sizes 403 and 405 is set to the predetermined distance as a predetermined ratio with respect to the face sizes.

In this embodiment, even if the positions of the parts other than the eye in the face are unknown, the areas can be set up. However, when the face information acquired from the face detection block in the image recognition circuit 38 includes varieties of information about a nose, a mouth, and a cheek, etc., the areas may be set using them.

It should be noted that the blocks 423, 425, and 427 in the nose-cheek area and the blocks 433, 435, and 437 in the mouth area are set up so as not to overlap. And finally an area 441 is set up to cover the whole face.

Figure 6A:
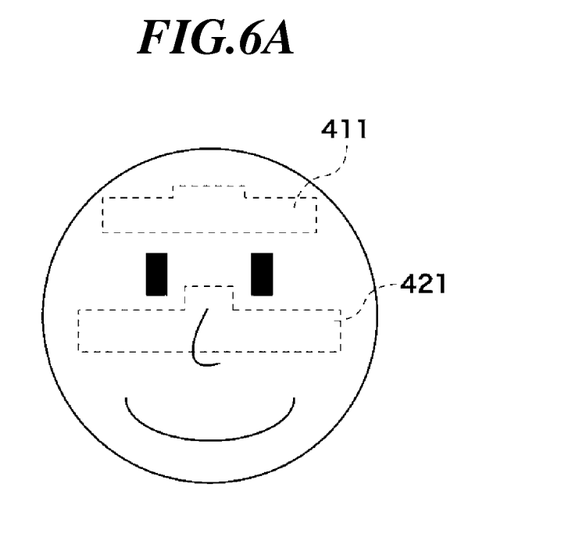
FIG. 6A and FIG. 6B are the views showing areas in a face acquired as information about a histogram.
Figure 6B:
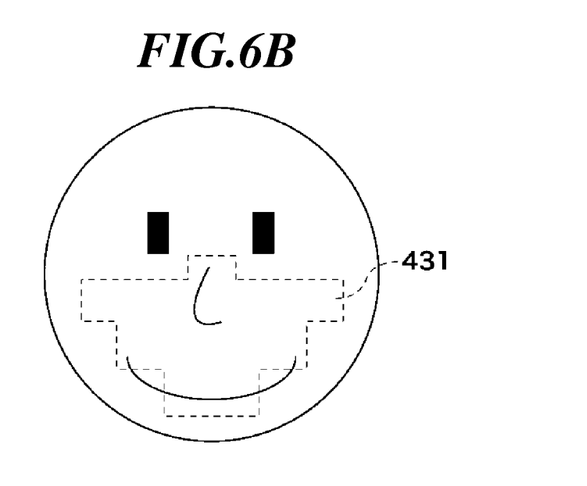

Thus, the face is divided into the ten areas and a histogram of brightness is acquired from each area. FIG. 6A and FIG. 6B are the views showing the areas in the face acquired as information about a histogram. When acquiring a histogram, as shown in FIG. 6A, three pieces of brightness distribution information about the three blocks 413, 415, and 417 in the forehead area are combined, and information (data) about one histogram in the forehead area 411 is acquired. In the same manner, three pieces of brightness distribution information about the three blocks 423, 425, and 427 in the nose-cheek area are combined, and information (data) about one histogram in the nose-cheek area 421 is acquired.

As shown in FIG. 6B, six pieces of brightness distribution information about the six blocks 423, 425, 427, 433, 435, and 437 in a nose-cheek-mouth area are combined, and information (data) about one histogram in the nose-cheek-mouth area 431 is acquired.

Thus, since the areas are beforehand divided into small areas, respectively, the brightness distribution corresponding to a complex facial shape can be acquired by adding the brightness distributions of these small areas when acquiring the brightness distribution. The histogram in the forehead area 411 and the histogram in the nose-cheek area 421 that are acquired here are used for detecting a high brightness area in a person's face. On the other hand, the histogram in the nose-cheek-mouth area 431 is used for detecting a low brightness area.

Thus, since the person's face is divided into areas, it becomes possible to acquire the person's forehead area histogram, the nose-cheek area histogram, the nose-cheek-mouth area histogram, and whole face histogram as a histogram of brightness.

FIG. 7A, FIG. 7B, FIG. 7C, and FIG. 7D are examples of histograms showing brightness distributions of the respective areas. In these histograms that comprises the forehead area histogram, the nose-cheek area histogram, the nose-cheek-mouth area histogram, and the whole face histogram, a horizontal axis represents the brightness value (8 bits), and a vertical axis represents the number of pixels (pixel count) having the specific brightness value shown by the horizontal axis.

Figure 7A:
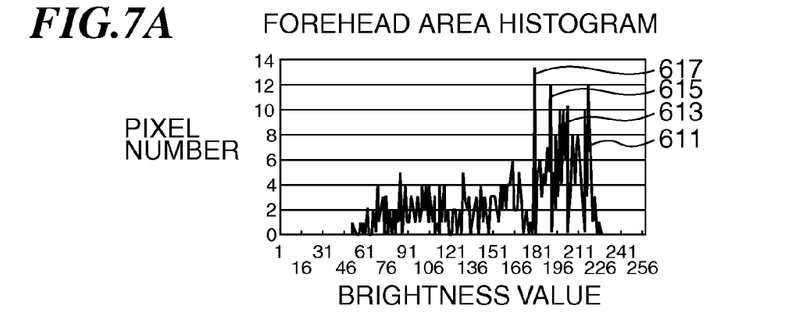
FIG. 7A, FIG. 7B, FIG. 7C, and FIG. 7D are histograms showing brightness distributions of the respective areas in the face shown in FIG. 6A and FIG. 6B.
Figure 7B:
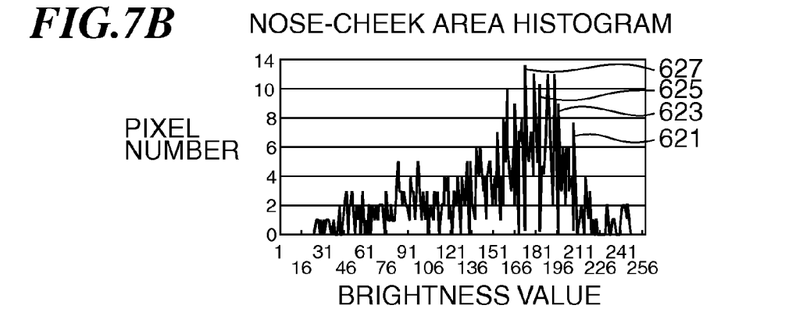

FIG. 7A and FIG. 7B show the forehead area histogram and the nose-cheek area histogram that are equivalent to the areas 411 and 421 in FIG. 6A, respectively. In both of the forehead area histogram and the nose-cheek area histogram, since the pixel count increases as the brightness becomes higher, it can be assumed that there is no forelock or hat that hides the forehead of the person, and that the person is exposed to a strong extraneous light. When black forelock etc. hides the forehead, a distribution inclined toward the high brightness side like FIG. 7A is not seen. When the face is not exposed to the strong extraneous light, the distribution inclined toward the high brightness side is not seen in either the forehead area histogram or the nose-cheek area histogram.

In order to grasp how many pixels are distributed to the high brightness side, a brightness value $LightY(n)$ at a position of a specific ratio to a distributed total pixel number is calculated. The brightness value $LightY(n)$ represents the brightness value of the pixel of which the count is no of the distributed total pixel number when counting from the pixel of the least brightness value in the histogram. For example, in the forehead area histogram in FIG. 7A, the brightness values 617, 615, 613, and 611 are calculated as the brightness values $LightY(70)$, $LightY(85)$, $LightY(90)$, and $LightY(95)$ for the four specific ratios at the high brightness side.

Similarly, in the nose-cheek area histogram in FIG. 7B, the brightness values 627, 625, 623, and 621 are calculated as the brightness values $LightY(70)$, $LightY(85)$, $LightY(90)$, and $LightY(95)$ for the four specific ratios at the high brightness side. It should be noted that a brightness value averaging the brightness values 627, 625, 623, and 621, or the brightness value of the highest pixel number can be used as a high-brightness value $LightY$ mentioned later.

When the forehead is hidden, it is considered that the brightness value $LightY(n)$ of the forehead area is low. In this case, it is preferable to compare the brightness value $LightY(n)$ calculated from the forehead area with the brightness value $LightY(n)$ calculated from the nose-cheek area, and to use the higher brightness value $LightY(n)$ as the high-brightness value.

Figure 7C:
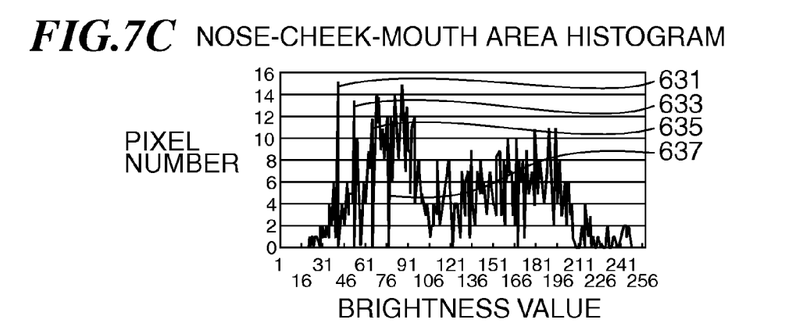

FIG. 7C shows a nose-cheek-mouth area histogram corresponding to the area 431 in FIG. 6B. In this embodiment, it is assumed that the face detection block in the image recognition circuit 38 cannot detect a vertex position of a convex-part of the cheek. Therefore, a histogram including blocks 423, 425, and 427 in the cheek area is acquired. Accordingly, a certain number of pixels are distributed to the high brightness side.

Since the nose-cheek-mouth area histogram is used to detect a shadow of a low brightness occurred in the person's face, it is hardly affected when a certain number of pixels are distributed to the high brightness side. Therefore, the histogram is used to calculate a brightness value $ShadeY(n)$ at a position of a specific ratio at the low brightness side. The brightness value $ShadeY(n)$ represents the brightness value of the pixel of which the count is no of the distributed total pixel number when counting from the pixel of the least brightness value in the histogram. And the brightness values 631, 633, 635, and 637 are calculated as the brightness values $ShadeY(5)$, $ShadeY(10)$, $ShadeY(15)$, and $ShadeY(30)$ for the four specific ratios like the high brightness side. It should be noted that a brightness value averaging the brightness values 631, 633, 635, and 637, or the brightness value of the highest pixel number can be used as a low-brightness value ShadeY mentioned later.

Figure 7D:
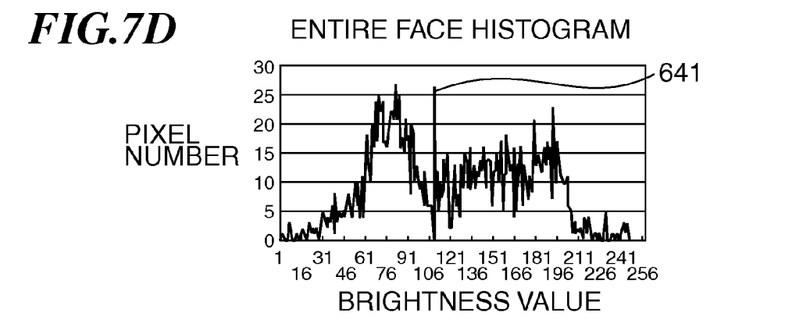

FIG. 7D shows the whole face histogram corresponding to the area 441 in FIG. 4 that include the main positions of a face such as a forehead, an eye, a cheek, a nose, and a mouth. The average brightness Y of a face is calculated using this whole face histogram. The brightness value 641 of the pixel of which the count is 50% of the distributed total pixel number is calculated as a brightness value FaceY.

Figure 8:
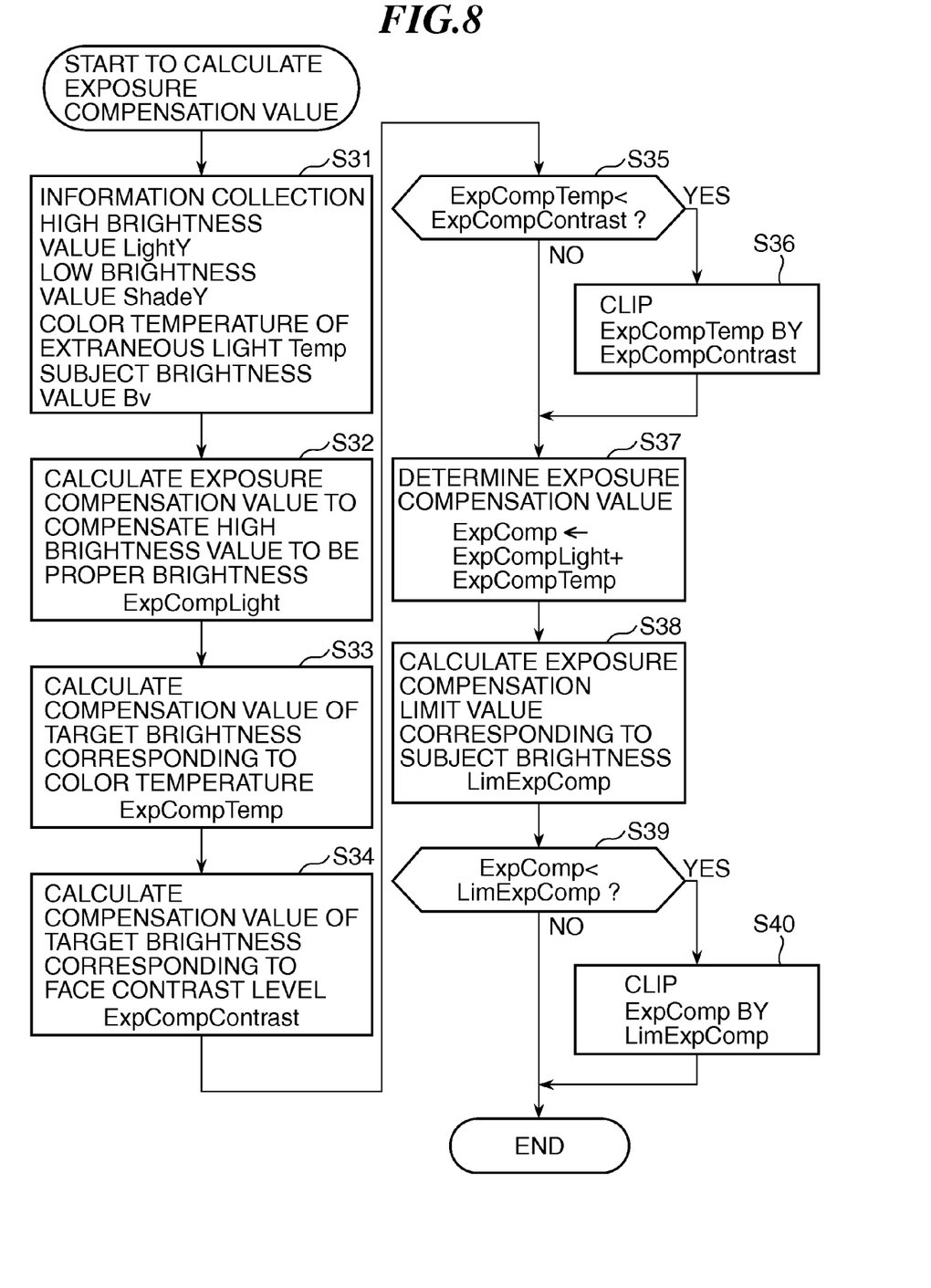
FIG. 8 is a flowchart showing an exposure compensation value calculation procedure.

Next, a method of determining an exposure under-compensation value corresponding to color temperature of an extraneous light, face contrast, and subject brightness will be described according to a flowchart shown in FIG. 8. FIG. 8 is the flowchart showing an exposure compensation value calculation procedure. This processing program is stored in a storage medium in the system control unit 60, and is executed by a CPU in the system control unit 60.

First, the system control unit 60 collects the information needed for calculating an exposure compensation value (step S31). Specifically, the system control unit 60 collects the brightness value LightY as information about the brightness in the high brightness area of the face region acquired by the above-mentioned histogram analysis process, the brightness value ShadeY as information about the brightness in the low brightness area of the face region, the color temperature Temp as information about the color temperature in the image, and the subject brightness Bv.

As the color temperature Temp in the image, the value acquired as a part of an AWB process is used. An origin of this color temperature Temp is the color information extracted by the image processing circuit 50. The subject brightness Bv as information about the brightness of the subject is acquired as a part of an AE process. An origin of this subject brightness Bv is the brightness information extracted by the image processing circuit 50. Not only the brightness of the person whose face contrast has calculated, but also the brightness of the other area in the taken image is considered. At this time, the subject brightness Bv may be calculated by averaging the brightness values acquired at a plurality of areas in the taken image or may be acquired by adding the brightness values that have been acquired at a plurality of areas in the taken image and modified by predetermined weights.

The AE process controls the exposure so that average brightness within a face of a target person becomes proper brightness, and similarly controls the exposure when there are variations of light and shade in the face. As a result, there are the brightness value LightY of a bright part and the brightness value ShadeY of a dark part with respect to the proper brightness. The system control unit 60 calculates an exposure under-compensation value that compensates for the brightness value LightY of the bright part in the face to be proper brightness according to the following equation (1) (step S32). Here, RefY is target brightness for controlling to be proper exposure with respect to the face area while executing the AE process.

$$ExpCampLight = \text{Log}_2 \frac{RefY}{LightY} \quad (1)$$

When the exposure value calculated by the AE process is corrected in underexposure by the above-mentioned ExpCompLight value, there is no part brighter than the proper brightness in the face.

Figure 9:
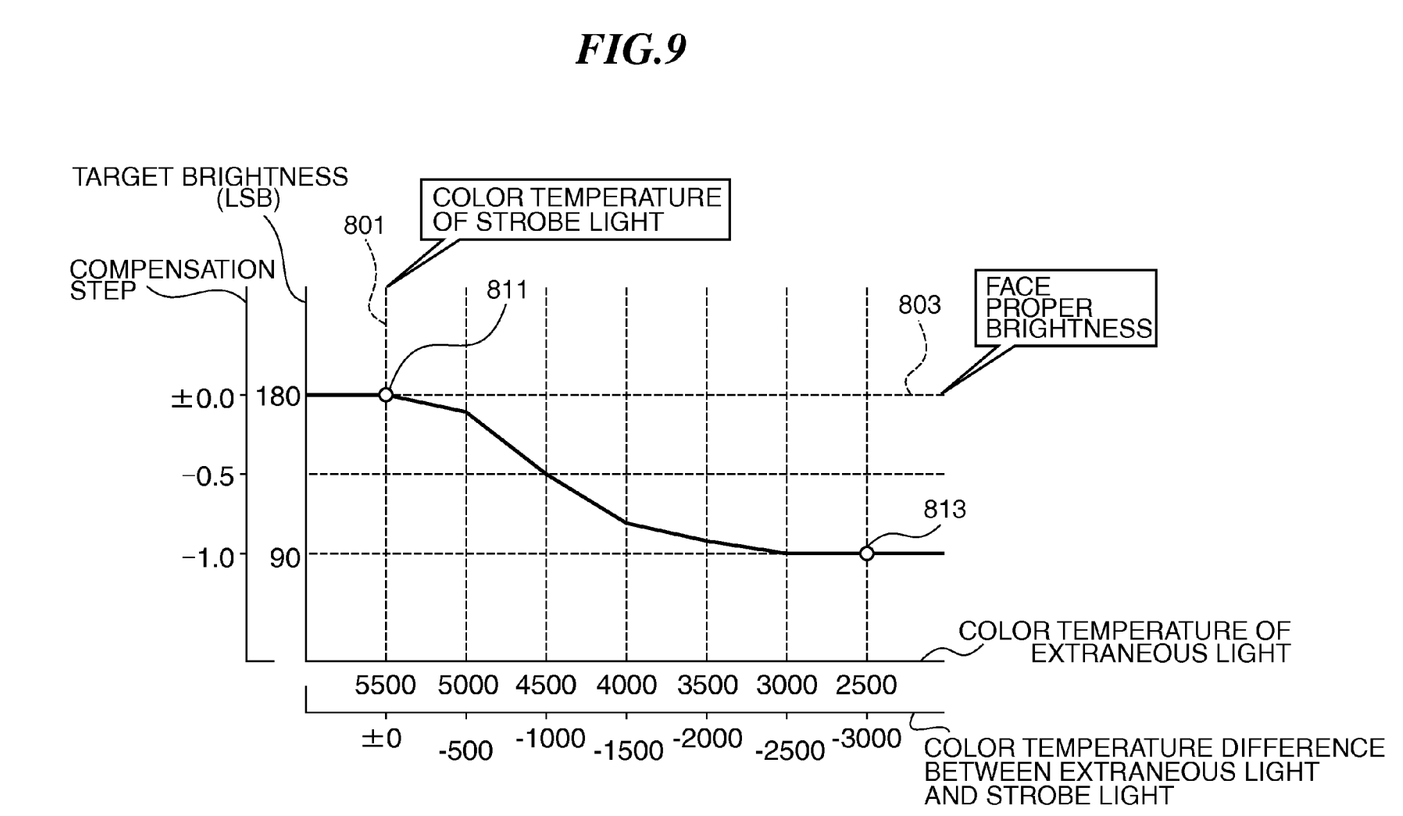
FIG. 9 is a graph showing correlation between target brightness corresponding to a color temperature of an extraneous light and an under-compensation step.

The system control unit 60 calculates an ExpCompTemp value as an exposure under-compensation value (first compensation value) corresponding to a color temperature difference between the strobe light and the extraneous light (step S33). A predetermined graph shown in FIG. 9 is used for this calculation. FIG. 9 is the graph showing correlation between the target brightness corresponding to the color temperature of the extraneous light and an under-compensation step. A horizontal axis represents the color temperature of the extraneous light in a range between 2500 K and 5500 K, and also represents the color temperature difference between the strobe light and the extraneous light in a range between 0 K and 3000 K. A vertical axis represents the target brightness used when controlling by the AE process to be correct exposure, and the under-compensation step that compensates it.

The graph in FIG. 9 assumes that the camera is provided with the strobe that emits a light having the color temperature of 5500 K as shown by a strobe light color temperature 801, and that the target brightness level of the AE process is 180 LSB as shown by face proper brightness 803.

A point 811 in FIG. 9 means that the target brightness keeps 180 LSB without the under-compensation and the compensation step is ±0, when there is no color temperature difference between the strobe light and the extraneous light.

As compared with this, a point 813 means that the color temperature difference between the strobe light and the extraneous light becomes −3000 K because the extraneous light has low color temperature of 2500 K, the target brightness becomes 90 LSB as a result of the under-compensation, and the compensation step is −1.0.

Thus, since the target brightness decreases as the color temperature difference between the strobe light and the extraneous light increases, the exposure is set so that the extraneous light amount that impinges on the person's face decreases as the color temperature difference increases. The target brightness under-compensations value calculated using the table in FIG. 9 and the color temperature difference becomes the ExpCompTemp value that is the exposure under-compensation value corresponding to the color temperature of the extraneous light.

Figure 10:
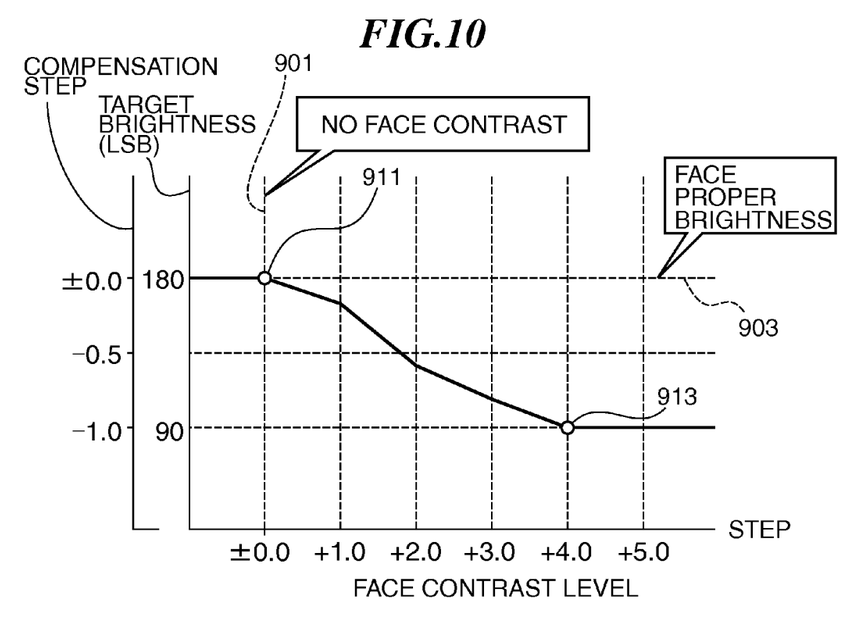
FIG. 10 is a graph showing correlation between target brightness corresponding to a face contrast level and an under-compensation step.

Next, the system control unit 60 calculates an ExpComp-Contrast value as an exposure under-compensation value (second compensation value) corresponding to the face contrast level (step S34). That is, the exposure under-compensation value is calculated based on a comparison result of the information about the brightness in the high brightness area in the face area with the information about the brightness in the low brightness area. A predetermined graph shown in FIG. 10 is used for this calculation. FIG. 10 is the graph showing correlation between the target brightness corresponding to the face contrast level and the under-compensation step. A horizontal axis represents a step showing the face contrast level. The face contrast level represents brightness difference between the high-brightness part (area) in the face and the low-brightness part (area), and is expressed as a value of ΔContrast that is calculated according to the following equation (2) using the brightness value LightY and the brightness value ShadeY that are calculated from the histogram analysis of FIG. 7A, FIG. 7B, and FIG. 7C.

$$\Delta \text{ Contrast} = \text{Log}_2 \frac{\text{Light } Y(1)}{\text{Shade } Y(1)} \quad (2)$$

A vertical axis represents the target brightness used when controlling by the AE process to be correct exposure, and the under-compensation step that compensates it. In FIG. 10, the face contrast level ±0.0 is a step 901 when there is no face contrast. The graph in FIG. 10 shows a condition where there is no high contrast between the convex parts (such as a forehead, a nose, and a cheek) and the concave parts (from a lower cheek to a jaw).

The point 911 shows that the target brightness keeps 180 LSB and the compensation step is 0 because the face contrast level is 0. On the other hand, the point 913 shows that the face contrast level between the high brightness part and the low brightness part in the face is +4, and in this case, the target brightness becomes 90 LSB as a result of the under-compensation, and the compensation step becomes −1.0.

Thus, the exposure is set so that the target brightness decreases as the face contrast level increases (as the brightness difference between the high brightness part and the low brightness part becomes large). The exposure under-compensation value calculated using the graph in FIG. 10 and the face contrast level ΔContrast becomes an ExpCompContrast value that is an exposure under-compensation value according to the face contrast level.

According to the earlier mentioned process, the two compensation values, which includes the ExpCompTemp value that is an exposure under-compensation value corresponding to the color temperature difference and the ExpCompContrast value that is an exposure under-compensation value corresponding to the face contrast level, are calculated. And then, the process proceeds to a next step S35.

The system control unit 60 determines whether the ExpCompTemp value that is an exposure under-compensation value corresponding to the color temperature difference is smaller than the ExpCompContrast value that is an exposure under-compensation value corresponding to the face contrast level, i.e., whether the compensation for the color temperature difference needs larger amount of compensation (step S35).

When the ExpCompTemp value is smaller than the ExpCompContrast value, and needs larger amount of compensation, the system control unit 60 executes the following process. That is, the system control unit 60 clips the ExpCompTemp value by the ExpCompContrast value, i.e., substitutes the ExpCompContrast value for the ExpCompTemp value (step S36).

This process decreases the exposure under-compensation amount with respect to the target brightness (increases the compensation value) when the color temperature difference between the strobe light and the extraneous light is large but when the face contrast level is small. That's because the color temperature difference in the face by shooting with the strobe emission is small without respect to the strobe light amount even if the color temperature difference between the strobe light and the extraneous light is large when the face contrast level is small. In this embodiment, the above-mentioned two correlation graphs shown in FIG. 9 and FIG. 10 are provided, the exposure under-compensation values are found from the respective graphs, and the exposure under-compensation value is determined by a matrix of both the values.

As another method, the exposure under-compensation value may be calculated according to a predetermined formula (a functional expression) rather than the correlation graphs.

When it is determined that the ExpCompTemp value is equal to or larger than the ExpCompContrast value in the step S35, or when the process in the step S36 is executed, the system control unit 60 executes the following process. That is, the system control unit 60 calculates an exposure under-compensation value ExpComp by summing the exposure under-compensation value ExpCompLight and the exposure under-compensation value ExpCompTemp (step S37). The exposure under-compensation value ExpCompLight is a value for adjusting the brightness value LightY of the bright parts in the face calculated in the step S33 with the target brightness. On the other hand, the exposure under-compensation value ExpCompTemp is obtained from the target brightness determined by the color temperature difference and the face contrast level.

In steps S38, S39, and S40, the system control unit 60 executes a clipping process corresponding to the subject brightness Bv with respect to the exposure under-compensation value ExpComp calculated in the step S37. This clipping process prevents executing the exposure under-compensation process too much in a high-brightness environment like outdoors in daytime. The exposure under-compensation process is executed depending on the color temperature of the extraneous light and the face contrast. When executing the exposure under-compensation process in the high-brightness environment like the outdoors in daytime, a background which is not exposed to the strobe light may become dark even when shooting in a bright location. Therefore, the clipping process mentioned above is executed so as to acquire a more suitable image in the high-brightness environment like the outdoors in daytime.

As mentioned above, a strobe emission is effective in the following situation. That is, when there is high possibility to cause subject moving and hand shake due to slow shutter speed in a low illumination environment, the shake can be prevented by increasing shutter speed and under-exposure can be compensated with a strobe light. In this case, since the shutter speed increases, the whole image is in underexposure, a background which is not exposed to the strobe light holds dark. Although the phenomenon in which a background becomes dark when shooting with the strobe emission has a small influence in a low illumination environment, it has a large influence in a high brightness environment like the outdoors in daytime.

Figure 11:
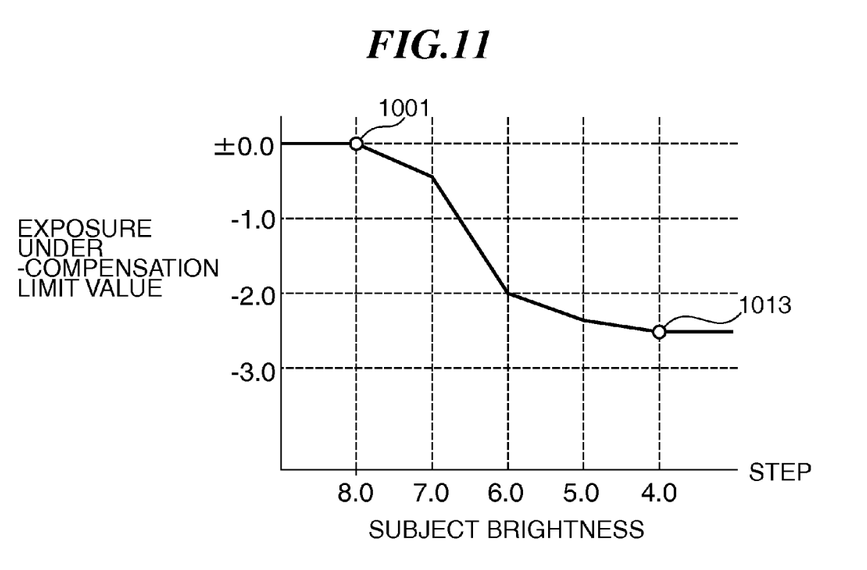
FIG. 11 is a graph showing an exposure under-compensation limit value corresponding to subject brightness.

The system control unit 60 calculates an exposure under-compensation limit value LimExpComp (a compensation limit value) corresponding to the subject brightness Bv according to the graph in FIG. 11 (step S38). FIG. 11 is the graph showing the exposure under-compensation limit value corresponding to the subject brightness. A horizontal axis represents the subject brightness Bv. On the other hand, a vertical axis represents the exposure under-compensation limit value.

At a point 1001, the subject brightness is as high as Bv=8. In such a high brightness case, since there is a high possibility to be in the outdoors in daytime, the exposure under-compensation limit value is clipped as 0.0 step not to execute the exposure under-compensation process.

At a point 1013, the subject brightness is as low as Bv=4. In such a low brightness case, there is a high possibility to be indoors and the exposure under-compensation limit value is set as −2.5 steps. Thus, the possibility to be in the indoor (i.e., the possibility not to be in the outdoors in daytime) becomes higher as the brightness decreases, and it can be determined that the influence becomes smaller even if the background becomes dark.

The system control unit 60 compares the exposure under-compensation limit value LimExpComp, which is calculated corresponding to the subject brightness By according to the graph in FIG. 11, with the exposure under-compensation value ExpComp calculated in the step S37 (step S39). When the exposure under-compensation value ExpComp is smaller than the exposure under-compensation limit value LimExp- Comp (i.e., the compensation amount is larger), the system control unit 60 clips the exposure under-compensation value ExpComp by the exposure under-compensation limit value LimExpComp, i.e., substitutes the exposure under-compensation limit value LimExpComp for the exposure under-compensation value ExpComp (step S40). Thus, a setting range of the exposure under-compensation value ExpComp is restricted. Then, the system control unit 60 finishes the process.

On the other hand, when it is determined that the exposure under-compensation value ExpComp is equal to or larger than the exposure under-compensation limit value LimExp-Comp at step S39, the system control unit 60 finishes this process as-is.

Thus, the exposure under-compensation value ExpComp that is the exposure under-compensation value with respect to the target brightness in consideration of the color temperature difference between the strobe light and the extraneous light, the face contrast level, and the subject brightness is calculated by the process shown in FIG. 8.

Figure 12:
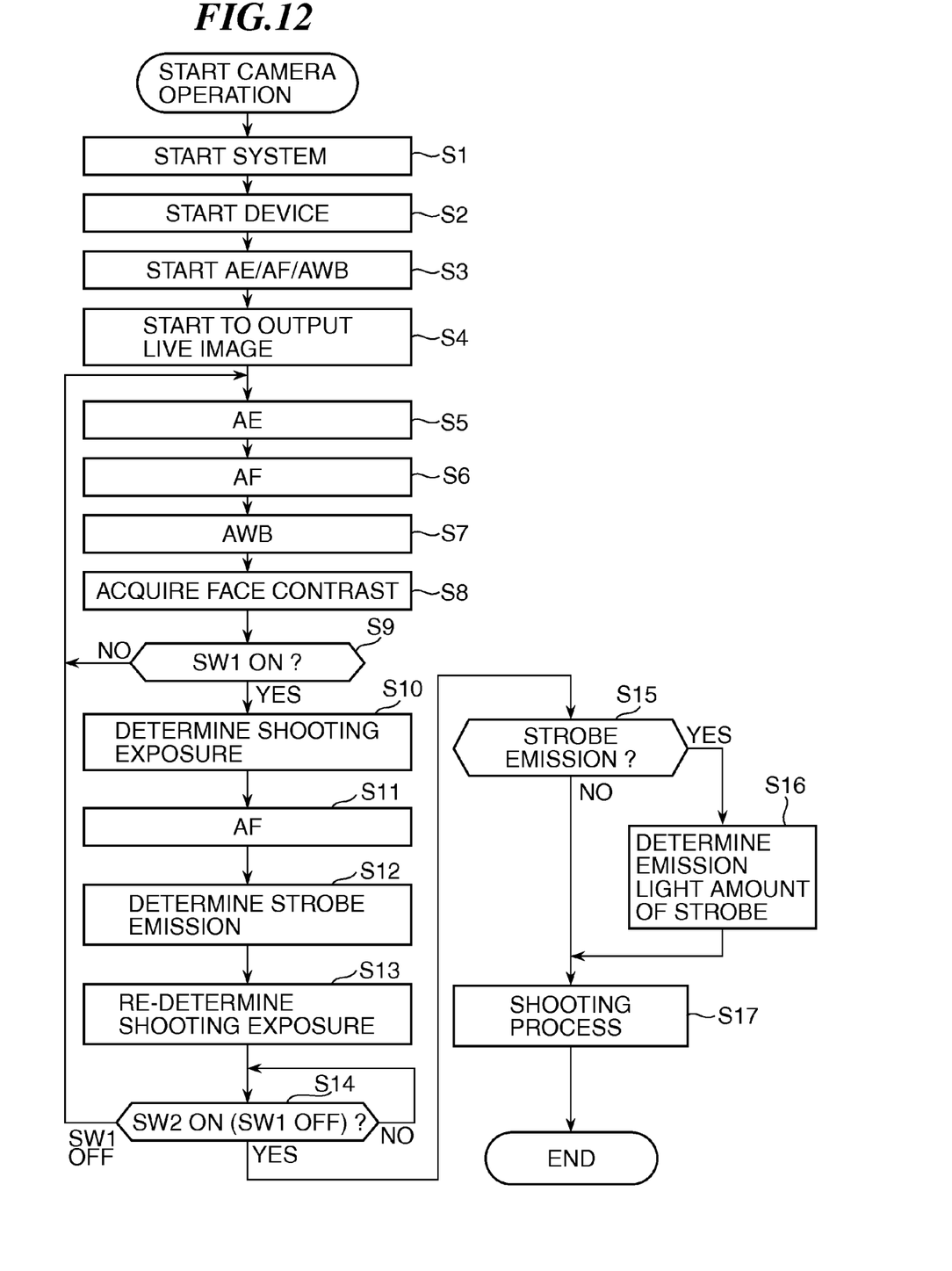
FIG. 12 is a flowchart showing an entire procedure of a shooting operation.

FIG. 12 is a flowchart showing the entire operation when shooting by a camera having the function of the exposure under-compensation process shown in FIG. 8. This processing program is stored in a storage medium in the system control unit 60, and is executed by the CPU in the system control unit 60.

After starting a camera, the system control unit 60 supplies electric power to units in the camera, and executes a system startup process for the CPU, a memory, etc. (step S1).

Then, the system control unit 60 starts various devices such as a zooming motor for moving the lens 10 mounted on the camera to a shooting position, a focusing motor, the diaphragm 14, and the mechanical shutter 12 (step S2).

After starting the system and devices that are needed to operate the camera, the system control unit 60 starts AE/AF/AWB processes in order to display a subject image on an LCD under a suitable condition in brightness, focus, and colors (step S3).

When the preparation to display a subject image in the suitable condition is completed, the system control unit 60 displays the continuous image (live image) read from the image pickup device 16 onto the image display device 108 (step S4).

During the display of the live image, the system control unit 60 periodically repeats the AE, AF, and AWB processes to continuously maintain the suitable condition in brightness, focus, and colors even if an operation is inputted by a photographer or the subject itself changes (steps S5, S6, and S7).

The face contrast level is calculated by another routine executed in parallel to the above-mentioned process. The system control unit 60 acquires a target person's face contrast level calculated by this face-contrast-level calculation process (step S8).

The system control unit 60 monitors whether the photometry switch turned on by depressing the shutter button 104 halfway (step S9). When the photometry switch does not turn on, the system control unit 60 returns the process to the step S5. On the other hand, when the photometry switch turns on, the system control unit 60 executes various pre-processes accompanying shooting.

First, the system control unit 60 executes the AE process that sets shooting exposure (i.e., an aperture, a shutter speed, and a sensitivity) properly corresponding to brightness of a subject (step S10). At this time, the exposure is determined with the assumption that the strobe does not emit. Then, the system control unit 60 executes the AF process to bring the subject into focus (step S11). Here, the system control unit 60 does not only bring the subject into focus but also calculates a distance from the camera to the subject.

After the exposure is determined in the step S10 and the focus is determined in the step S11, the system control unit 60 executes a strobe emission determination process to determine whether the strobe will be emitted (step S12). In this strobe emission determination, various factors are considered.

For example, since a possibility to shake increases when the shutter speed determined by the exposure determination in the step S10 is less than a predetermined value, the shutter speed is reset higher and a strobe emission is determined.

In this embodiment, the face-contrast computed result acquired in the step S8 is referred at the time of this strobe emission determination, and a strobe emission is determined when a face has contrast.

The system control unit 60 re-determines the shooting exposure only when emitting the strobe. That is, the system control unit 60 executes a compensation process of the exposure determined in the step S10 for every factor of the strobe emission (step S13).

For example, when the strobe emission is determined to reduce shake due to a slow shutter speed, the system control unit 60 compensates the shutter speed to increase by steps to prevent the shake. When the strobe emission is determined due to the face contrast in this embodiment, the system control unit 60 compensates the exposure in an under direction by the exposure under-compensation value ExpComp determined by the process shown in FIG. 8.

When the shooting conditions are fixed by turning on the photometry switch, the system control unit 60 monitors whether the release switch is turned on as a shooting instruction (step S14). When the photometry switch turns off without turning on the release switch, the system control unit 60 returns the process to the step S5.

On the other hand, when detecting the release switch turns on, the system control unit 60 determines whether it emits the strobe, based on the result of the strobe emission determination (step S15). When the strobe emission has been determined in the step S12, the system control unit 60 executes a process that determines strobe light amount at the time of shooting according to this determination (step S16).

This process is known as a metering process to obtain a reflectance and a size of a subject based on subject brightness exposed to only an extraneous light and subject brightness exposed to a pre-emission strobe light of a predetermined light amount, and to calculate light amount of the strobe light to be emitted at the time of shooting. In this case, the light amount is calculated in consideration of the exposure compensation amount (the exposure under-compensation value) ExpComp calculated by the process in FIG. 9. That is, the emission light amount of the strobe increases so as to compensate the exposure reduced by the exposure compensation. When shooting a person's face, fundamentally, the brightness of the face is obtained by averaging the brightness values of the respective parts in the face, and the emission light amount is determined so that the average brightness becomes the proper brightness.

After determining the emission light amount of the strobe, the system control unit 60 executes the shooting process (step S17). Then, the system control unit 60 finishes the process. If the image pickup device is exposed to the suitable light and a development process is performed, an image with preferred brightness, focus, and color is obtained.

In this development process, the brightness of a low brightness area in the image can be corrected to be brighter. For example, when there is face contrast, the contrast level is reduced by applying the exposure under-compensation process and then shooting with the strobe emission. However, a dark part may remain in the face due to an uneven distribution of the strobe light etc. In such a case, a more suitable image can be obtained by increasing brightness of the dark part in the face during the development process.

Thus, the image pickup apparatus according to the embodiment reduces the difference in the colors of lights illuminating the respective parts in the face at the time of shooting with the strobe emission by executing the exposure under-compensation process to decrease the extraneous light, when the face has contrast due to difference in color temperature between the strobe light and the extraneous light. Simultaneously, the apparatus is possible to obtain a suitable image by reducing the contrast difference in the face.

That is, the camera detects that the person's face has brightness difference due to the extraneous light having different color temperature from the strobe light. When emitting the strobe in such a condition, the camera controls the strobe emission by adjusting exposure by decreasing a ratio of the extraneous light amount to the strobe light amount so as to reduce the difference in color temperatures of the parts (convex parts and concave parts) in the face. Accordingly, the brightness difference between the high brightness area and the low brightness area in the face can be reduced, and a strobe emission image with a suitable face color can be obtained because the color temperature difference of each part of the person's face decreases. At this time, when considering not only the person's face color, but also background brightness to maintain suitable brightness corresponding to subject brightness, more preferable image can be shot.

It should be noted that the present invention is applicable to not only the configuration of the above-mentioned embodiment, but also any configurations as long as the functions shown in the claims or the functions of the configuration of the embodiment can be achieved.

For example, although the above-mentioned embodiment describes the case where a person's face is shot as a subject, the present invention is not limited to this and can be applied to the case where various subjects such as animals and ornaments are shot.

In the above-mentioned embodiment, the high brightness area is a convex part in a face, and the low brightness area is a concave part in a face. However, an area having high brightness may serve as the high brightness area, and an area having low brightness may serve as the low brightness area, without respect to concave and convex parts in a subject.

Although the above-mentioned embodiment describes the camera with built-in strobe as a light emitting unit as an example, the present invention can be applied to a camera with a detachable strobe.

In the above-mentioned embodiment, although the digital camera of compact type has been described as an example of the image pickup apparatus, the present invention is also applicable to a digital camera having an exchangeable lens unit, a video camera, etc.

In the above-mentioned embodiment, although the exposure compensation amount is determined in consideration of subject brightness, the exposure compensation amount may be determined without taking the subject brightness into consideration. For example, when a shooting mode optimized to indoor shooting (a party mode etc.) is selected from among shooting modes optimized to specific shooting scenes, the exposure compensation amount may be determined without taking the subject brightness into consideration.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-289343, filed on Dec. 21, 2009, which is hereby incorporated by reference herein in its entirety.

What is claimed is:

1. An image pickup apparatus that is possible to shoot with a light emitting unit emitting a light, the light emitting unit unchanging a color temperature of the emitted light to an arbitrary color temperature, the apparatus comprising:
a color temperature information acquisition unit configured to acquire information about a color temperature of a light illuminating a subject; and
an emission control unit configured to control emission of the light emitting unit,
wherein said emission control unit determines emission light amount of the light emitting unit based on a color temperature difference between the color temperature of the emitted light of the light emitting unit and a color temperature of the light illuminating the subject in a case where the light emitting unit does not emit the light, based on the information acquired by said color temperature information acquisition unit,
wherein said emission control unit controls the light emitting unit to emit the light of the determined emission light amount.

2. The image pickup apparatus according to claim 1, wherein said emission control unit increases the emission light amount as the color temperature difference increases.

3. The image pickup apparatus according to claim 1, further comprising:
a brightness information acquisition unit configured to acquire information about the brightness of the subject,
wherein said emission control unit determines emission light amount of the light emitting unit based on the color temperature difference, and a comparison result between information about brightness in a high brightness area in the subject in a case where the light emitting unit does not emit the light and information about brightness in a low brightness area in the subject in a case where the light emitting unit does not emit the light, that are acquired by said brightness information acquisition unit.

4. The image pickup apparatus according to claim 3, wherein said emission control unit increases the emission light amount as brightness difference between the brightness in the high brightness area and the brightness in the low brightness area based on the information acquired by said brightness information acquisition unit increases.

5. The image pickup apparatus according to claim 4, wherein said emission control unit increases the emission light amount as the color temperature difference increases and the brightness difference increases.

6. The image pickup apparatus according to claim 3, further comprising:
a face detection unit configured to detect a face area of the subject,
wherein said emission control unit determines the emission light amount of the light emitting unit based on the color temperature difference, and a comparison result between information about brightness in a high brightness area in the face area and information about brightness in a low brightness area in the face area that are acquired by said brightness information acquisition unit.

7. The image pickup apparatus according to claim 1, further comprising:
an exposure control unit configured to control exposure,
wherein said exposure control unit controls the exposure at the time of shooting with emitting the light emitting unit based on a color temperature difference between a color temperature of the emitted light of the light emitting unit and a color temperature of the light illuminating the subject in a case where the light emitting unit does not emit the light, based on the information acquired by said color temperature information acquisition unit.

8. The image pickup apparatus according to claim 7, wherein said exposure control unit shifts the exposure to underexposure as the color temperature difference increases.

9. The image pickup apparatus according to claim 7, further comprising:
a brightness information acquisition unit configured to acquire information about the brightness of the subject,
wherein said exposure control unit shifts the exposure to underexposure based on the color temperature difference, and a comparison result between information about brightness in a high brightness area in the subject in a case where the light emitting unit does not emit the light and information about brightness in a low brightness area in the subject in a case where the light emitting unit does not emit the light that are acquired by said brightness information acquisition unit.

10. The image pickup apparatus according to claim 9, further comprising:
a face detection unit configured to detect a face area of the subject,
wherein said exposure control unit shifts the exposure to underexposure based on the color temperature difference, and a comparison result between information about brightness in a high brightness area in the face area and information about brightness in a low brightness area in the face area that are acquired by said brightness information acquisition unit.

11. The image pickup apparatus according to claim 9, wherein said exposure control unit shifts the exposure to underexposure as brightness difference between the brightness in the high brightness area and the brightness in the low brightness area based on the information acquired by said brightness information acquisition unit increases.

12. The image pickup apparatus according to claim 11, wherein said exposure control unit shifts the exposure to underexposure as the color temperature difference increases and the brightness difference increases.

13. The image pickup apparatus according to claim 9, further comprising:
a calculation unit configured to calculate a compensation value that is used by said exposure control unit when shifting the exposure to underexposure,
wherein said exposure control unit shifts the exposure to underexposure based on the compensation value calculated by said calculation unit.

14. The image pickup apparatus according to claim 13, wherein said calculation unit sets up a limit value of the compensation value based on the information acquired by said brightness information acquisition unit.

15. The image pickup apparatus according to claim 13, wherein said calculation unit calculates a first compensation value for shifting the exposure to underexposure based on the color temperature difference, and calculates a second compensation value for shifting the exposure to underexposure based on the comparison result, and
wherein said exposure control unit shifts the exposure to underexposure based on one of the first and second compensation values that is smaller in degree to shift the exposure to underexposure.

16. The image pickup apparatus according to claim 9, wherein said emission control unit increases the emission light amount so as to compensate the exposure reduced as said exposure control unit shifts the exposure to underexposure.

17. A control method for an image pickup apparatus that is possible to shoot with a light emitting unit emitting a light, the light emitting unit unchanging a color temperature of the emitted light to an arbitrary color temperature, the method comprising:
a color temperature information acquisition step of acquiring information about a color temperature of a light illuminating a subject; and
an emission control step of controlling emission of the light emitting unit,
wherein emission light amount of the light emitting unit is determined in said emission control step based on a color temperature difference between the color temperature of the emitted light of the light emitting unit and a color temperature of the light illuminating the subject in a case where the light emitting unit does not emit the light, based on the information acquired in said color temperature information acquisition step,
wherein said emission control step controls the light emitting unit to emit the light of the determined emission light amount.

* * * * *